US012023734B2

United States Patent
Irissou et al.

(10) Patent No.: US 12,023,734 B2
(45) Date of Patent: Jul. 2, 2024

(54) APPARATUS AND METHOD FOR TEMPERATURE CONTROLLED COLD SPRAY

(71) Applicant: NATIONAL RESEARCH COUNCIL OF CANADA, Ottawa (CA)

(72) Inventors: Eric Irissou, Longueuil (CA); Jean-Gabriel Legoux, Repentigny (CA); Cristian Victor Cojocaru, Longueuil (CA); Florin Ilinca, Kirkland (CA); Sylvain Bournival, Boucherville (CA)

(73) Assignee: National Research Council of Canada

( * ) Notice: Subject to any disclaimer, the term of this patent is extended or adjusted under 35 U.S.C. 154(b) by 29 days.

(21) Appl. No.: 17/121,004

(22) Filed: Dec. 14, 2020

(65) Prior Publication Data

US 2021/0187618 A1     Jun. 24, 2021

Related U.S. Application Data

(60) Provisional application No. 62/948,531, filed on Dec. 16, 2019.

(51) Int. Cl.
*B05B 7/14*        (2006.01)
*B22F 10/364*     (2021.01)
(Continued)

(52) U.S. Cl.
CPC ............ *B22F 10/85* (2021.01); *B22F 10/364* (2021.01); *B22F 10/38* (2021.01); *B22F 12/13* (2021.01);
(Continued)

(58) Field of Classification Search
CPC ........ B22F 10/85; B22F 10/364; B22F 10/38; B22F 12/13; B22F 12/43; B22F 12/49; B22F 12/53; B22F 12/90; B22F 2203/11; B33Y 10/00; B33Y 30/00; B33Y 40/10; B33Y 40/20; B33Y 50/02; B05B 7/1486;
(Continued)

(56) References Cited

U.S. PATENT DOCUMENTS 3,310,423 A    3/1967   Ingham, Jr.
6,066,575 A    5/2000   Reardon et al.
(Continued)

FOREIGN PATENT DOCUMENTS

CN       110328364 A    10/2019
EP        3756798 A1    12/2020

OTHER PUBLICATIONS

WO2015/108546, Nauka et al., Generating Three Dimensional Objects, published Jul. 23, 2015 (Year: 2015).*
(Continued)

*Primary Examiner* — Charles Capozzi
(74) *Attorney, Agent, or Firm* — Brett Reynolds

(57) ABSTRACT

A technique for improving cold spray deposition conditions for cold spray additive manufacture of parts involves providing an in-situ temperature feedback controller with a remote instantaneous temperature sensor supplying surface temperature measurements of the deposition surface, and a (preferably long pulse) laser for heating. Temperature feedback allows for control over deposition conditions yielding predictable deposition properties.

15 Claims, 4 Drawing Sheets

(51) Int. Cl.

| | | |
|---|---|---|
| *B22F 10/38* | (2021.01) | |
| *B22F 10/85* | (2021.01) | |
| *B22F 12/13* | (2021.01) | |
| *B22F 12/43* | (2021.01) | |
| *B22F 12/49* | (2021.01) | |
| *B22F 12/53* | (2021.01) | |
| *B22F 12/90* | (2021.01) | |
| *B33Y 10/00* | (2015.01) | |
| *B33Y 30/00* | (2015.01) | |
| *B33Y 40/10* | (2020.01) | |
| *B33Y 40/20* | (2020.01) | |
| *B33Y 50/02* | (2015.01) | |
| *C23C 24/08* | (2006.01) | |

(52) U.S. Cl.
CPC .............. *B22F 12/43* (2021.01); *B22F 12/49* (2021.01); *B22F 12/53* (2021.01); *B22F 12/90* (2021.01); *B33Y 10/00* (2014.12); *B33Y 30/00* (2014.12); *B33Y 40/10* (2020.01); *B33Y 40/20* (2020.01); *B33Y 50/02* (2014.12); *C23C 24/08* (2013.01); *B05B 7/1486* (2013.01); *B22F 2203/11* (2013.01)

(58) Field of Classification Search
CPC ......... C23C 24/08; C23C 24/04; C23C 24/00; Y02P 10/25
USPC .................................................. 118/308, 641
See application file for complete search history.

(56) References Cited

U.S. PATENT DOCUMENTS

| | | |
|---|---|---|
| 6,258,402 B1 | 7/2001 | Husary et al. |
| 6,491,208 B2 | 12/2002 | James et al. |
| 6,523,921 B2 | 2/2003 | Codos |
| 7,625,198 B2 | 12/2009 | Lipson et al. |
| 7,740,410 B2 | 6/2010 | Nishi et al. |
| 8,020,509 B2 | 9/2011 | Calla et al. |
| 8,021,715 B2 | 9/2011 | Jensen et al. |
| 8,252,384 B2 | 8/2012 | Jensen et al. |
| 8,783,584 B2 | 7/2014 | Fukanuma |
| 9,095,858 B2 | 8/2015 | Fukanuma |
| 9,169,968 B2 | 10/2015 | Pettis et al. |
| 9,481,933 B2 | 11/2016 | Mohanty |
| 2002/0170890 A1 | 11/2002 | Keicher et al. |
| 2005/0030544 A1* | 2/2005 | VanWiggeren ...... G01M 11/331 356/450 |
| 2006/0133947 A1 | 6/2006 | DeBiccari et al. |
| 2008/0085368 A1 | 4/2008 | Gauthier |
| 2009/0246398 A1 | 10/2009 | Kurahashi et al. |
| 2010/0068410 A1 | 3/2010 | Jensen et al. |
| 2010/0173087 A1 | 7/2010 | Calla et al. |
| 2011/0300306 A1 | 12/2011 | Mohanty |
| 2014/0234551 A1 | 8/2014 | Sparkes et al. |
| 2014/0291886 A1 | 10/2014 | Mark et al. |
| 2015/0020852 A1 | 1/2015 | Kato et al. |
| 2015/0030761 A1 | 1/2015 | Kato et al. |
| 2019/0366466 A1* | 12/2019 | Hutchison .............. B23K 9/125 |
| 2020/0180224 A1* | 6/2020 | Budge .................... B33Y 10/00 |
| 2020/0398457 A1* | 12/2020 | Zhang ..................... B22F 12/17 |

OTHER PUBLICATIONS

Bray, M. et al., Surface & Coatings Technology, The Laser-assisted Cold Spray process and deposit Characterization 203 (2009) 2851-2857.

Ryabinin, N., et al., Simulation of Gas-Substrate Heat Exchange During Cold-Gas Dynamic Spraying, International Journal of Thermal Sciences, 2012, vol. 56, 12-18.

McDonald, A.G. et al., Gas-Substrate Heat Exchange During Cold-Gas Dynamic Spraying, Journal of Thermal Spray Technology 22 (2-3); 2012, 391-397.

Perton, M. et al., Effect of Pulsed Laser Ablation and Continuous Laser Heating on the Adhesion and Cohesion of Cold Sprayed Ti-6A1-4V Coatings, Journal of Thermal Spray Technology, 2012 vol. 21(6): 1322-1333.

Rech, S. et al., Influence of Preheated Al-6061 Substrate Temperature on the Residual Stresses of Multipass Al Coatings Deposited by Cold Spray, Journal of Thermal Spray Technology, 2011, vol. 20, 243-251.

Legoux, E. et al., Effect of Substrate Temperature on the Formation Mechanism of Cold-Sprayed Aluminium, Zinc and Tin Coatings, Journal of Thermal Spray Technology, 2007, vol. 16(5); 619-626.

European Search Report dated Feb. 24, 2021.

* cited by examiner

While cold spraying:

RITS
10 — Measure temperature at at least one point $s_1$ on deposition surface

Controller
12 — Compute laser output at a point $s_2$ at a time with respect to impact of a point $s_3$, so that $s_3$ has a desired deposition Laser modulator
14 — Apply the laser output to point $s_3$ at the time wrt impact

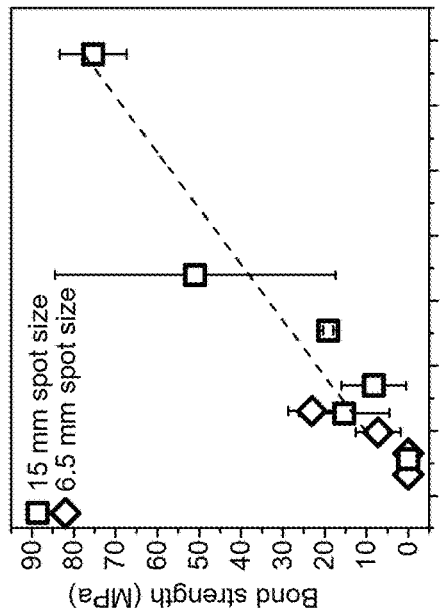
FIG. 5A
FIG. 5B
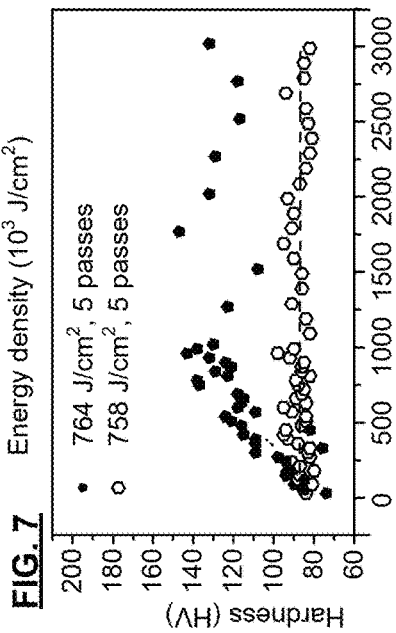
FIG. 8A
FIG. 8B
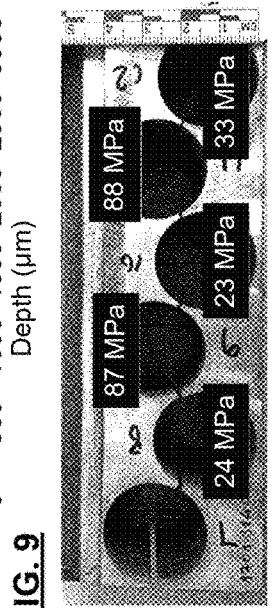
FIG. 7
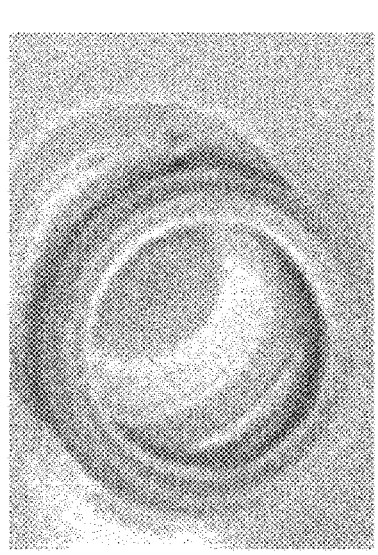
FIG. 6A
FIG. 6B
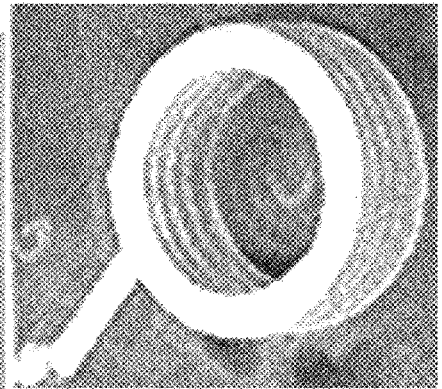
FIG. 10
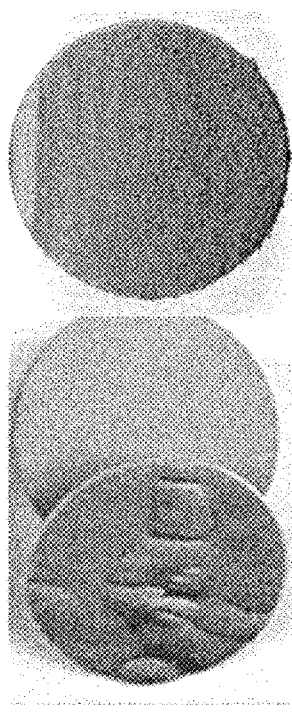
FIG. 9
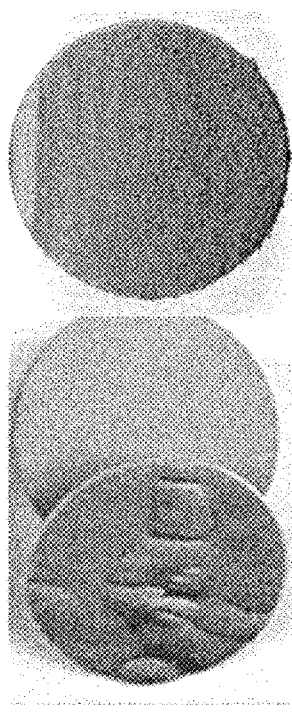
FIG. 11

APPARATUS AND METHOD FOR TEMPERATURE CONTROLLED COLD SPRAY

FIELD OF THE INVENTION

The present invention relates in general to laser-assisted cold spray deposition and, in particular, to the use of feedback for thermal regulation and improved cold spray deposition to improve a range of the cold spray deposition conditions, for spraying on parts having complex topography, or additive manufacturing.

BACKGROUND OF THE INVENTION

Cold spray (CS) is an industrialized process for applying coatings and to dimensionally restore parts, and holds promise for additive manufacturing, however a lack of consistency, most notable in the fabrication of large and complex parts, is a substantial limitation to broader utilization. CS is a method of depositing (usually metallic or ceramic-metallic composite) materials by accelerating solid powders in a supersonic gas jet and propelling the jet towards a substrate. During impact with the substrate (or previously deposited layer), particles undergo plastic deformation and adhere to the surface to build-up a bead. The kinetic energy of the particles, supplied by the expansion of the gas, is converted to plastic deformation energy favoring bonding. CS is therefore a solid state process having many advantages over melt-fusion processes in terms of oxidation and phase control, and these advantages make CS attractive for additive manufacturing (CSAM), and for coating parts of complex geometry. Near net shape part production has been proven in a variety of materials, with density and material properties that approach the bulk properties of the materials for some substrate and coating material combinations. However these have largely been demonstrated on flat parts, and with relatively constant deposition parameters at every point in the deposition (i.e. at every instant of a tool path used to deposit a bead or track on the surface). Herein deposition parameters include stand-off distance, spot size, deposition angles, scan rate, and rates of change of each of these, all of which are defined in any instant by any tool path. While CS nozzle parameters (supply gas composition, temperature and pressure, powder dimensions, morphology and temperature, feed rates, and particle speed and inertia) are at least as relevant to a density, microstructure, and deposition efficiency of the bead, as these are presumed to run in a steady state, they are not efficiently varied parameters of most industrial systems. A tool path is a program dictating how the cold spray nozzle is scanned over a substrate to deposit the bead, usually in a collection of "passes" to build up a desired part. A pass is understood to refer to a collection of adjacent trajectories that define a single layer of a coating, but may be understood in additive manufacture to refer to a complete set of scans (or the resulting deposited beads) that must be sprayed before a next layer of deposition can be added. To produce a variety of complex surface structures beyond layered coatings, with desired deposition efficiency, microstructure, density, and to reduce a number of passes or scans required to form an added form or structural deposition, in an industrial setting, there is a need to make CS deposition more flexible and reliable.

Some problems in the art are highlighted by the frequent difficulties experienced when scaling-up processes from coupon-sized parts, to full-scale parts and components that have complex geometries. While process conditions may be satisfactory for the former, there are challenges to finding tool paths that permit scans over components with satisfactory deposition properties.

Even before CSAM, CS research was preoccupied with thermal control over CS deposition, for example by selection of CS nozzle parameters to improve deposition efficiency and density. There are limits to how hot the propellant gas can be, for example to avoid warping substrates, and the powders can only be heated to a limited degree before an undesirable amount of oxidation or melting occurs. For example, studies [1]-[5] have shown that substrate surface temperatures affect the overall microstructure quality of the final coatings. This impact can be positive (e.g. by enhancing bonding or reducing porosity), or it can be negative (e.g. by increasing oxidation).

U.S. Pat. No. 8,020,509 to Calla teaches an apparatus for cold spray coating with heat assisted pretreatment, and/or annealing using a heat source. The heat source may be a laser or heating elements. Specifically: 600-900 nm wavelength diode lasers are said to have a suitable power density for heating ranges between 104-105 W/cm$^2$; the shape of the laser beam may be tailored according to the width and cross-section of the coating material pattern that is emitted from the cold spray nozzle; and other suitable lasers include Nd:YAG lasers and Yb doped fiber lasers having wavelengths between 600-1100 nm, or (if ceramic coating materials are applied) $CO_2$ lasers having a wavelength of approximately 10 microns may be used. The heat source is mounted on a manipulator with the spray gun, or separately on another mounting apparatus, but the beams from the laser unit travel on a path similar to the path travelled by the spray gun so that as the spray gun applies a coating to the substrate, the beams from the laser unit proceed and/or follow the stream of coating material.

Calla states that applying heat via the laser beams while the coating material is applied results in a more efficient and effective system. Calla states that the pattern, intensity and distance of the laser beams from the spray pattern may be adjusted to effectively apply the coating material depending on such factors as, the coating material used, and the substrate. Note that these factors are process-independent and do not typically vary at any point during a process, let alone within a single pass or scan. Furthermore Calla's teachings are merely directed to forming coatings, such as protective layers, suggesting only simple overlapping passes as the tool path, and Calla identifies only a single coating material pattern throughout deposition.

U.S. Pat. No. 9,481,933 to Pravansu teaches a coaxial laser-assisted cold spray apparatus, and explains that heat from the laser can: pre-heat substrates (with or without gas supply) to make them more amenable to plastic deformation, and to prepare the substrate for coating; and heat particles during flight to more readily deform on impact. As a result, Pravansu states that a wider variety of substrates (harder or softer) can be cold spray coated; particles can be supplied at lower pressure; critical velocity of the particles can be reduced; damage of substrate can be reduced; and a wider variety of particles can be sprayed. In situ annealing is also suggested. Like Calla, this reference fails to suggest anything other than a coating deposition.

U.S. Pat. No. 8,021,715 to Jensen teaches and claims a technique for laser assisted cold spray deposition where laser/EM heat treatment can be applied after a temporarily adhered coating is applied, or thereafter. The non-heat treated areas remain temporarily adhered and are easily removed after the heat treated areas are permanently bonded. Jensen also teaches a method of using a laser beam to direct which part of the substrate is permanently adhered to, and entirely avoiding deposition elsewhere. Paraphrasing from Jensen: while the cold gas spray nozzle allows relatively accurate alignment of the particle jet on the surface of the workpiece, the energy source for the EM radiation can be very accurately aligned independently of the cold gas spray nozzle, so that build-up of a bead with highly accurate geometry is possible.

US2006/0133947 to DeBiccari et al. teaches a technique for laser assisted cold spray with the laser either attached to, or separately directed on, the deposition surface to heat or densify/sinter the substrate for a "short duration" with "YAG lasers" to recover ductility without significant heat input to the substrate or underlying cold spray deposits. The deposits may be a coating or a "structural deposit".

US2008/0085368 to Gauthier teaches a technique for pulsed heating of, and pulsed deposition on, a substrate to build a coating, and temporal proximity of these two pulses so that functional preheating of the substrate coincides with the deposition, for improved metallurgical bonding. Gauthier addresses short pulse heating periods and leveraging these with suitably timed deposition pulses. Like Calla, Gauthier fails to suggest anything other than a coating. Gauthier is not principally concerned with cold spray, but recites this list of coating techniques: "High Velocity Oxygen Fuel (HVOF), High Velocity Air Fuel (HVAF), plasma spray, laser sintering/cladding, kinetic metallization, electric arc deposition and detonation coating", and considers melting the surface to be one form of functional preheating.

US2014/0234551 to Sparkes et al. teaches laser assisted CS deposition. Sparkes teaches, at [0018], controlling a laser or other heating means, and movement of the powder jet with respect to the substrate to provide a spatial temperature distribution at the powder footprint region of the substrate, in which the local temperature of the substrate from the surface to at least a depth of 0.2 mm is 0.5 Ts (solidus temperature of the substrate material), and not more than 0.25 Ts at a depth of 1 mm from the surface. At para. [0056] it is stated that lasers permit very precise patterning of the deposited layer because the laser beam can be controlled exceptionally tightly spatially, and in terms of switching on and off. The spatial control allows for heating only a very narrow track on the substrate and the particles will only adhere in this area. Sparkes also reports having produced islands of deposition by toggling the laser on and off ([0182]). Furthermore, while Sparkes does teach varying laser intensity profile "based on changes in conditions at the substrate, e.g. for depositing subsequent layers on previously-deposited layers", these changes are only called for at different layers of coatings, and not within a single spray pass, nor within a single scan. Sparkes specifically teaches varying the laser intensity profile from layer to layer, or to provide fixed profiles of 2 s on and off with a 500 mm/min traverse speed, but fails to teach or suggest monitoring temperature during deposition, or of feedback.

Accordingly improved laser-assisted cold spray techniques are needed for increasing a range of tool paths for CS deposition with suitable adhesion, microstructure, and deposition efficiency.

SUMMARY OF THE INVENTION

Applicant has discovered a process of cold spray deposition with better control over deposition properties (i.e. adhesion, cohesion, density, thickness, deposition efficiency and microstructure), that allows for a wider variety of acceptable deposition parameters and therefore a larger space of tool paths to deposit or additively manufacture a part, and permits CS deposition on substrates with complicated geometries. The process relies on improved temperature control during deposition, by way of feedback. Temperature control has many advantages, including the ability to improve deposition properties without changing deposition parameters and therefore provides an additional control that affects deposition. Temperature control can quickly react to ensure desired deposition properties. Thermal feedback for controlling CS deposition can be provided with a laser (preferably pulsed), and a remote temperature sensor capable of instantaneous measurement (e.g. an infrared camera or a pyrometer), which is calibrated for or corrected for variation in surface emissivity. During cold spray deposition, temperature of the sprayed surface is monitored, and fed to a controller. The controller has software for receiving real-time temperature measurements, and outputs feedback to control the laser for assisted heating (and optionally also a cooling system such as cool jet of air). Favourable conditions for cold spray deposition can therefore be ensured. An internal or external laser modulator (optical or electronic), may be provided for controlling the laser beam delivered to the deposition surface, for example by varying: a laser output power, pulse duration, or pulse width; a fraction of the beam's power projected on the surface; a distance between a laser spot from the spray jet or a time from the laser spot until deposition at that location; a focus/beam width of the spot; an angle of incidence; or rate of traverse of the beam spot over the surface). The controller may compute signals for controlling the laser assisted heating using a model of the part thus far built-up, and may depend on a prescribed cold spray deposition tool path, or may further exert control over the tool path. During cold spray, thermal models of part geometry throughout a deposition process can be produced and verified, for sound process planning and part manufacture can be tested on parts formed with thermal control, to generate mass-produced additively manufactured part process rules for laser assisted deposition without or with lower resolution thermal feedback.

Maintaining a desired surface temperature for cold spray deposition is not trivial, even for uniform deposition of layers on a deposition surface. Even if the surface is a flat plate, thermal shedding varies considerably on: a position of the plate; how it is supported; and on the heat already supplied to the plate. When the surface topology of the part is complex, modelling heat shedding can be more complicated. When the part is additively manufactured with a substantial depth of added material in some places and not others, thermal controls to establish consistent thermal environments for the cold spray process becomes even more difficult. When angle of incidence, transverse speeds and directions, stand-off and angle of incidence relative to advance direction, change throughout a tool path, as may be required for CSAM of modestly complicated structures, controlling temperature to ensure adequate deposition properties can be even more essential.

While there has been some appreciation of the possible effects of laser heating, for example, in improving resolution of cold spray deposited traces, there has been little notice of the accumulated effects of such heating, and for controlling heating at a spatial resolution commensurate with the local thermal environment, or to match current deposition parameters, to ensure deposition properties. Surface temperature feedback with a laser can allow for improved adhesion, density and deposition efficiency over a wider variety of tool paths. The temperature feedback can further assist with:

improving resolution of the deposited structure by narrowing a trace with higher accuracy deposition; reducing heat treatments required to recover ductility after strain hardening of the CS material; and, particularly with pulsed lasers, with reducing or avoiding oxidation.

The CS feedback system can be used 1) to provide part fabrication records for parts that have quality assurance requirements; 2) to produce an optimized tool path and laser control process for high-volume CSAM parts; 3) to calibrate or test lower-cost, lower fidelity temperature sensors for quality assurance (QA) systems, or train autonomous QA systems, for high-volume CSAM parts fabrication; or 4) to apply coating or AM depositions on complex parts in challenging environments where heat modeling is not satisfactory.

As such the controller may be a process controller, a thermal sub-process controller, or a stand-alone thermal feedback regulator. The degree to which the controller is integrated with other CS systems (primarily a robotic actuator for controlling a traverse path for scanning the substrate with respect to the CS jet, though secondarily may include parameters for controlling the CS nozzle, powder feedstock supply, a cooling system, additional sensors or process specific subsystems) may depend on numerous factors. For example, a higher degree to which thermal control affects the tool path according to a control strategy; or a higher uncertainty of the tool space positioning; and lower tolerances of parts would all tend to call for greater integration. Some control strategies use lower mobility motion subsystems to control the laser beam with respect to the jet.

Further features of the invention will be described or will become apparent in the course of the following detailed description.

Accordingly, a temperature controlled, heat assisted, cold spray apparatus is provided, the apparatus comprising: a cold spray nozzle, a laser, a remote instantaneous temperature sensor (RITS), and a robotized machine for directing: the nozzle to project a spray jet onto a surface of a substrate for cold spray deposition; the laser to selectively heat the surface near or overlapping the jet; and the RITS to sense a temperature of the surface at at least one first point near the jet, but not overlapping the jet or the laser; while scanning the jet across the substrate according to a tool path, with controlled motion of at least one of the substrate, a holder for the substrate, and the cold spray nozzle, by the robotized machine; and a controller adapted to: receive a measured temperature from the RITS in a plurality of sequential time steps; and use the temperature with a model of the substrate and a planned traversal path, to control the laser to vary a laser output to ensure deposition at a time with respect to impact, will have desired deposition properties.

The nozzle, and at least an optical path element for controlling a beam of the laser, may be mounted to a frame, and a robotic actuator is provided for scanning the substrate with respect to the frame, either by moving the frame, or by moving the substrate. The nozzle and optical path element for controlling the beam of the laser may have fixed orientations with respect to the frame, or the optical path element may be mounted to the frame by an actuable joint.

The controller may comprise a processor and program instructions for looking up a model-predicted temperature of the substrate at a point on the surface at a first time with respect to impact based on a thermal model of the substrate. The processor and program instructions may enable the controller to: determine a current temperature at the point from the measured temperature by the RITS; determine a temperature range required at the point at a first time with respect to incidence with the jet to achieve a desired deposition property at the second point at a second time with respect to incidence; use a model-predicted temperature at the point and the current temperature to determine a heat required at the point; and select laser output, given an angle of incidence of the laser beam on the point, and an emissivity of the surface at the point, to raise the point to a temperature in the required range at the second time. The controller may control the actuable joint by which the optical path element is mounted to the frame. Determining the temperature range may further comprise determining at least one deposition parameter of the planned path at the time of incidence, and using the at least one deposition parameter to select a temperature range for selecting the deposition property. Selecting the laser output may further comprise determining a beam profile of the beam required to distribute heat across the surface centred on the point, to achieve a deposition property. The controller may further be adapted to control a beam of the laser by operating an optical reflection, diffraction or dispersion element to effect the desired beam profile at the surface. The second time may be from +0.1 to −20 s to incidence with the jet; the laser may heat treat the surface post-deposition; and the desired deposition property may include at least one of: density, ductility, and morphology of the deposition. Alternatively, the second time may be greater than 0.1 s to incidence with the jet; the laser may apply a pre-deposition heat treatment to clean, ablate, roughen, modify a surface metallurgy of, or heat treat the surface to be coated; the desired deposition property may include at least one of: a ductility, a morphology, a bond strength, and a cohesive strength of the deposition. The laser beam may preferably have an energy density within the ablation regime for the surface, and may only be applied to the surface before any cold spray material is deposited. Furthermore, the second time may be between −0.1 s and 5 s to incidence with the jet; the laser may heat the surface to a desired deposition temperature; and the desired deposition property may include at least one of: a deposition efficiency, width of the bead, bond strength, strength, and density of the deposit.

The processor and program instructions may enable the controller to output a process control program including at least a collection of tool paths defining cold spray deposition of the structure on the substrate, and coordinated laser assisted heating parameters, or to output a log of temperatures measured by the RITS to document the deposition, said log being useful for quality assurance and product verification and testing.

The laser may be a pulsed laser having a pulse rate between 10 μs and 5 s.

Any two or all three of the first, second and third points may be the same or overlapping points on the surface.

Also accordingly, a method for cold spray deposition is provided. The method involves projecting a cold spray jet and a laser beam, while moving the cold spray jet or a substrate to scan the jet across a surface of the substrate to deposit a bead, where, in each of three respective sequential timesteps: a remote instantaneous temperature sensor (RITS) measures a temperature of at least one first point on the surface; a measured temperature from the RITS is used to compute a laser output to the surface at least one second point at a second time, to favour deposition with a desired deposition property at a third point on the surface when it meets the spray jet; and the laser is controlled to deliver the computed laser output to the surface at the at least one second point at the second time.

A cold spray nozzle may be provided for emitting the jet and at least an optical path element for controlling a beam of the laser, the nozzle and optical path element mounted to a frame, and a robotic actuator may be provided for the moving according to a planned traversal path to effect the scan. The optical path element for controlling a beam of the laser may include an internal or external optical modulator (optical or electronic).

If a curvature and torsion of the surface along the planned path is bounded, scanning the surface may involve: maintaining a constant stand-off, traverse speed, and angle of incidence of the jet; and ensuring an angle of the frame with respect to the substrate, on an axis of the jet, aligns the laser beam with the substrate on the planned path at the second point; and the optical path element for controlling a beam of the laser may be fixed with respect to the nozzle such that the laser beam meets the second point at a first time with respect to incidence with the jet, that depends on the curvature and torsion. The scan may involve maintaining a stand-off, traverse speed, angle of incidence of the jet and an angle of the frame with respect to the substrate, on an axis of the jet, to ensure that the laser beam meets the substrate on the planned path at a second point with suitable actuation of a joint by which at least the optical path element for controlling the beam is mounted to the frame. If so, controlling the laser may further involve applying the suitable actuation to the joint so that the beam meets the second point at a first time with respect to incidence with the jet. Either or both the first and second point may lie on the planned traversal path.

Computing the laser output may involve looking up a model-predicted temperature of the substrate at the second point at a second time with respect to impact based on a thermal model of the substrate. Computing may specifically involve: obtaining a current temperature at the second point from the measured temperature at the first point; determining a temperature range required at the second point at the second time, to achieve the desired deposition property at the second point; and selecting laser output, given an angle of incidence of the laser beam, and an emissivity of the surface at the second point, to raise the second point to a temperature so that at the second time, the second point will be in the range. Computing the laser output may further involve: determining at least one deposition parameter of the planned path at the time of impact and selecting a laser output producing a temperature to influence the deposition property at the second point relative to the at least one deposition parameter; or determining a beam profile of the beam required to distribute heat across the surface centred on the second point, to achieve a deposition property; and controlling the laser further comprises operating an optical reflection, diffraction or dispersion element to effect the desired beam profile. Computing a laser output may involve executing a program at a controller.

The second time may be from +0.1 to −20 s to incidence with the jet; the laser beam may heat treats post-deposition; the desired deposition property includes at least one of: a density, ductility, and morphology of the deposition; and the laser meets the surface over a wider area than the jet. Alternatively, the second time may be greater than 10 ms to incidence with the jet; the laser may apply a pre-deposition treatment to clean, ablate, roughen, modify a surface metallurgy of, or heat treat, the surface to be coated; and the desired deposition property may include at least one of: a ductility, a morphology, a bond strength, and a cohesive strength of the deposition. Moreover, the second time may be from −0.1 to 5 s, to incidence with the jet; the laser beam may heat the surface to be coated to a desired deposition temperature; and the desired deposition property includes at least one of: a deposition efficiency, width of the bead, bond strength, strength, and density of the deposition.

The method may further involve: testing the deposition properties of the part after deposition of a structure, and outputting a process control program including at least a collection of tool paths defining cold spray deposition of the structure on the substrate, and coordinated laser assisted heating parameters; or storing a log of measured temperatures by the RITS to document the coating, said log useful for quality assurance and product verification and testing purposes.

BRIEF DESCRIPTION OF THE DRAWINGS

In order that the invention may be more clearly understood, embodiments thereof will now be described in detail by way of example, with reference to the accompanying drawings, in which:

FIGS. 5A,B are graphs showing heating by pulsed lasers: respectively illustrating peak and mean temperatures of substrates as a function of time; and effects of higher and lower pulse repetition rates on heating curves;

FIGS. 6A,B are images respectively of delaminated copper when cold sprayed without assisted heating, and a slightly oxidized but adherent copper coating applied with laser assisted heating;

FIG. 7 is a graph showing bond strength as a function of laser assisted energy density for two different spot sizes, showing increasing strength with higher energy density;

FIGS. 8A,B are images respectively of: a roll of masking tape that was cold sprayed with copper without laser assisted heating that delaminated; and a roll of masking tape that adhered to a substrate when sprayed with laser assisted heating;

FIG. 9 is a graph showing Vickers hardness of coatings applied as a function of depth of the coating where the coatings were applied with pulsed laser assisted heating of two laser energy densities;

FIG. 10 is a bar graph showing comparative sample Vickers hardness values of as sprayed and treated materials;

FIG. 11 is a photograph of a copper coated sample, sectioned to remove buttons for testing, with overlaid bond strengths of the corresponding buttons, the bond strengths are shown to vary greatly with distance from a bottom edge of the sample;

DESCRIPTION OF PREFERRED EMBODIMENTS

A cold spray (CS) deposition apparatus is provided, the apparatus includes a CS nozzle, a laser, and a remote instantaneous temperature sensor (RITS), each of which is oriented to face respective adjacent (overlapping or non-overlapping) regions of a deposition surface. A controller is provided that receives data from the RITS, and controls the laser heating of the surface. The hardware and software of the present invention controls, in real-time, temperature of the deposition surface throughout deposition.

Figure 1:
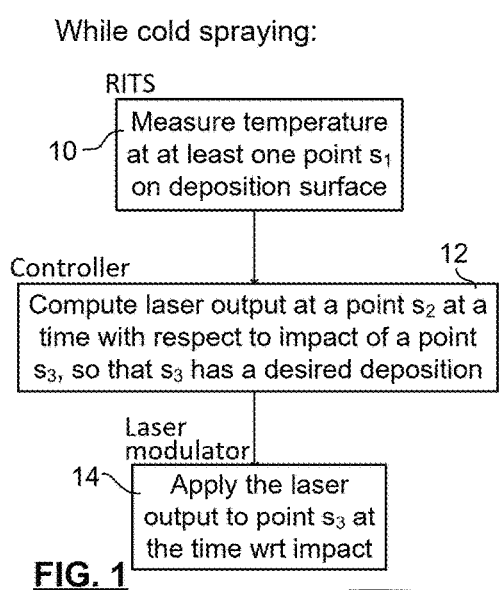
FIG. 1 is a block diagram showing principal steps in an ongoing control loop during cold spray in accordance with an embodiment of the present invention.

FIG. 1 is a schematic flow chart showing principal steps in a method that is performed throughout a CS deposition process in accordance with an embodiment of the present invention. The CS deposition process involves scanning a spray jet emitted by a CS nozzle over a substrate surface, while the CS nozzle operates in a steady state, by moving the CS nozzle, the surface, or both. At each instant, the spray jet meets a respective spot on the deposition surface at a location and has an instantaneous deposition angle, scan rate, stand-off. Typically CS deposition involves multiple scans to form passes, and multiple passes to build up a desired structure or coating, each scan laying a respective bead on a different area of the substrate, which may be adjacent to, overlapping, crossing, or disjointed from any previously laid bead. In some additive manufacture processes there may be no distinction between passes and scans, for example if deposition defines a simple or complex closed loop on the part surface, the whole part may be deposited in one continuous scan.

Different scans or passes may have respective deposition parameters, or even different CS nozzle parameters (feedstock composition, powder dimensions and morphology, feed rate, gas pressure, gas temperature, powder preheat temperature, gas composition, etc.), and a single scan can have varying deposition parameters. With 3 or more DoF mechanization between the substrate and CS nozzle, a prescribed tool path may be chosen for each scan. In some applications, each scan may approximately have constant deposition parameters, and in others, the tool path of a single scan will have various deposition angles, stand-offs, scan rates and rates of change of these, at respective points in the scan. A collection of scans may define a pass, and a collection of passes may define a deposition process.

CS Additive Manufacture (CSAM) can be performed by depositing continuous beads that extend from one edge of the surface to the other (a single scan). Furthermore with a suitable surface mask on the substrate (or using the laser control as taught by Jensen), the beads may be removed to end abruptly although deposited with constant deposition and nozzle parameters. If the deposition parameters are constant, the bead cross-section will typically vary only with surface temperature. By controlling temperature and other deposition parameters throughout the tool path, deposition properties can be controlled. To produce parts having regular properties, the 3+ DoF mechanization can follow prescribed (manual teach, modelled, or empirically determined) tool paths, on a substrate of a prescribed dimension.

In every measurement interval, a remote instantaneous temperature sensor (RITS) reports temperature of at least one point/region ($s_1$) on the substrate (step 10). Herein the term substrate denotes a part (which may be as simple as a flat or formed sheet, or any other structure) with an exposed deposition surface including a part surface and any material added thereto by current or previous deposition passes or scans, and is therefore the surface that a cold spray jet encounters, independent of material of constitution. The term RITS refers to any remote temperature sensor that can measure and report a temperature within the measurement interval. The measurement interval is shorter than a half a duration of a typical scan, and preferably the measurement interval multiplied by the scan rate's top linear traverse speed over the surface is shorter than ten times a width of: the bead; the spray jet; or a diameter of the CS nozzle outlet. To provide feedback for every deposition spot, the measurement interval times the local linear traverse speed is equal to a local extent of the deposition in the scan direction. Feedback for every $10^{th}$ spot may be adequate for many deposition processes. Typically the measurement interval may be between 0.1 and 10 ms, and the feedback rate may be $1/5^{th}$ to 2× the interval.

A thermal model of the part subject to the CS deposition process is used to guide CS deposition. While the model may simply provide a desired temperature of the substrate, at every localized spatio-temporal point of CS impact, it may also control a temperature difference or gradient between a deposited position and a non-deposited position that may be close to the deposited position, or may also control a heating or cooling rate across the substrate.

This model may be produced off-line using a CAD design of the part, with suitable material properties, coupled with thermodynamic modeling of CS deposition. Advantageously the model may be executed several times with varying environmental conditions, and may be empirically verified, to generate from the measurement temperature in the measurement interval at $s_1$, a model-predicted temperature $T_m$ at a point $s_2$ on the substrate, at a time $t_j$ when the spray jet of the CS nozzle is expected to meet $s_2$. While in principle the laser heat point $s_2$ may not actually meet the spray jet along the scan, and a third point $s_3$ may meet the jet at $t_j$ with the temperature of $s_3$ controlled by the heat supplied at $s_2$, the best control over the temperature and most efficient way to heat without overheating requires $s_2$ and $s_3$ overlap, and typically $s_3$ subsumes $s_2$. The point $s_2$ is a point that will soon/has (e.g. within less than 5 s.) encounter(ed) the spray jet, and that is subject to being heated (or not) by a laser before or since that time. Some or all points $s_1$ may or may not be points $s_2$ in different measurement intervals: for example, the measured points $s_1$ may all be made along a track that is parallel from the bead by a short distance, allowing for less interference from spray jet, ejecta, etc., but close enough to report the temperature where the spray jet meets the deposition surface, in which case each $s_1$ never occupies any point $s_2$ in any other interval. But if the points $s_2$ lie on the spray jet trajectory, there will be a correspondence or near correspondence in different intervals.

While the points $s_1$ and $s_2$ may have a fixed separation, such that in every measurement interval the pair of points have a same separation, depending on a tool path, curvatures of the deposition surface, and curvature of the bead on the surface, and a preference for measuring, or measuring away from, recently deposited material, it may be necessary to vary the separations of these points considerably, and model the effects. Even if the points $s_1$ and $s_2$ are the same point, and the time required for measurement, feedback and laser modulation (latency) is the time for $s_1$ to move to $s_2$, unless the bead has a constant curvature, and a constant linear traverse speed is used for deposition, the separations will generally vary.

A log of temperatures sampled from a plurality of locations at respective intervals can be used, with the model, to provide higher accuracy temporospatial thermal maps of the surface, particularly of the regions (such as $s_2$) for which deposition is impending. The model may specifically include the part as built by additive manufacture, but in some applications, e.g. where a thin coating is all that is applied, the coating effects may be neglected or otherwise compensated for. A thermodynamic environment of the part may also be modelled. If the part is very large, only a relevant region of the part may be modelled.

At step 13, it is determined whether the measured temperature is acceptable for the imminent deposition. If yes, the process may return to step 10 for the next measurement interval. In some applications feedback to a pulsed laser will be provided in each measurement interval and a null change signal may be sent. A pulsed laser may be preferred to a continuous wave laser, as it affords more options for varying a fluence. This data may be logged. If the measured temperature is not within provisions, the process may determine whether a difference between the measured temperature and an acceptable temperature ($\Delta$) is corrigible at $s_2$ by $t_i$ (step 15). This may amount to determining whether the measured temperature is within a second range of values, inferring whether a heating or cooling rate at the spot $s_2$ is acceptable, or whether an inferred spatial temperature distribution or gradient surrounding the spot $s_2$ is acceptable. The model may further log, monitor or predict annealing/quenching or cooling rates of previously deposited bead, based on time-lapsed measurements of the deposited bead while providing the input for the feedback control. The log may be analyzed online or off-line, to detect porosity, deposition thickness, profile, or defects, or attribute found defects to deposition conditions. Advantageously multiple RITS are used, or a single RITS is provided for measuring different pixelated regions of the substrate. Preferably the RITS tracks emissivity as well as temperature, such as two wavelength pyrometers.

The determination of whether the temperature is within provisions may depend on a responsiveness of the mechanization and any other feedback controls available for the CS deposition apparatus. Naturally, a fastest modulated system for controlling the thermal deposition environment will be the pulsed laser source, however, fluence limits (to limit ablation, environmental hazards, or natural limits of the laser or its controller) may preclude a temperature change that is required. Supplementary modulation schemes may involve varying an aperture, spot size, angle of incidence, attenuator, or beam splitter ratio to vary an amount of heat delivered, which may be performed with known optical equipment. The mechanization may allow for different rates of advance along a pre-established tool path, in response to temperature predictions.

If $\Delta$ is determined to be corrigible, a delivered power, such as an energy density of the pulsed laser, is adjusted to effect the correction (step 16). If $\Delta$ is not corrigible in time, it is determined at step 17 whether to abort the process, or continue. If the process is aborted the process ends, and the product may be discarded or recycled. If the process is not aborted, the exception may be logged (step 18). Whatever adjustment can be made in time, is made, and the process returns to step 10 for the next measurement interval.

It should be noted that the process, the model, or the data used at runtime, may not define the process events or decisions in these terms. For example, the data may consist of ranges of acceptable temperatures at respective points in the tool path, and corrective actions precomputed based on the model and the tool path that is fixed. A single temperature value of the substrate that is desired during deposition, or a temperature as a function of deposition angle, may be provided. By providing feedback, heat shedding variations from part to part, and thermal variations at edges, near substrate holders, etc. can be corrected to within limits of feedback lag.

Figure 2B:
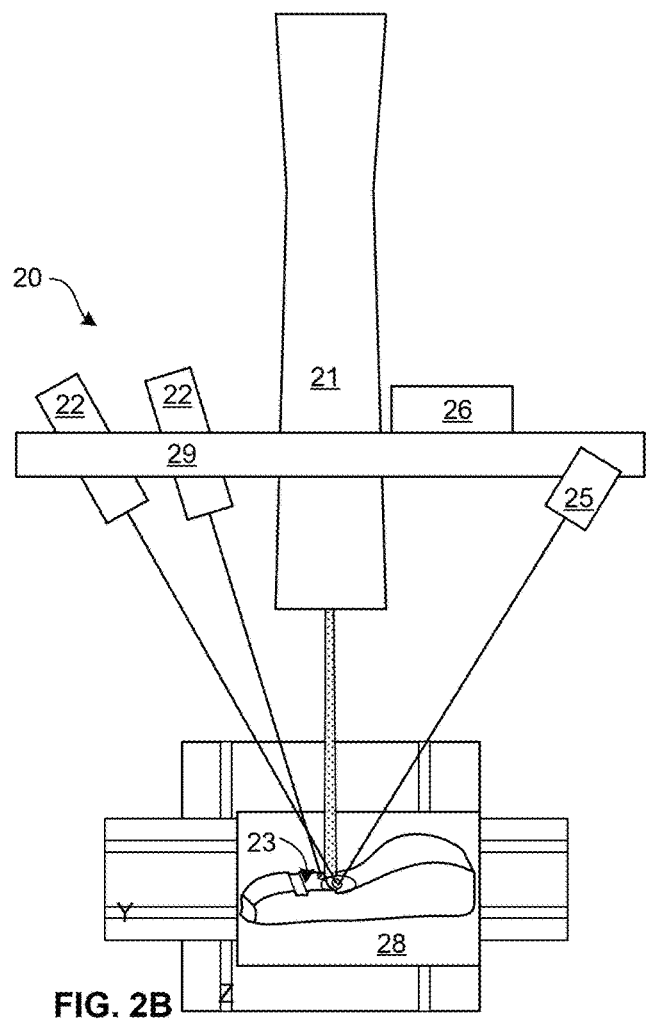
FIG. 2B is a schematic illustration of a cold spray deposition system for use in conjunction with a motion table in accordance with a second embodiment.
Figure 2A:
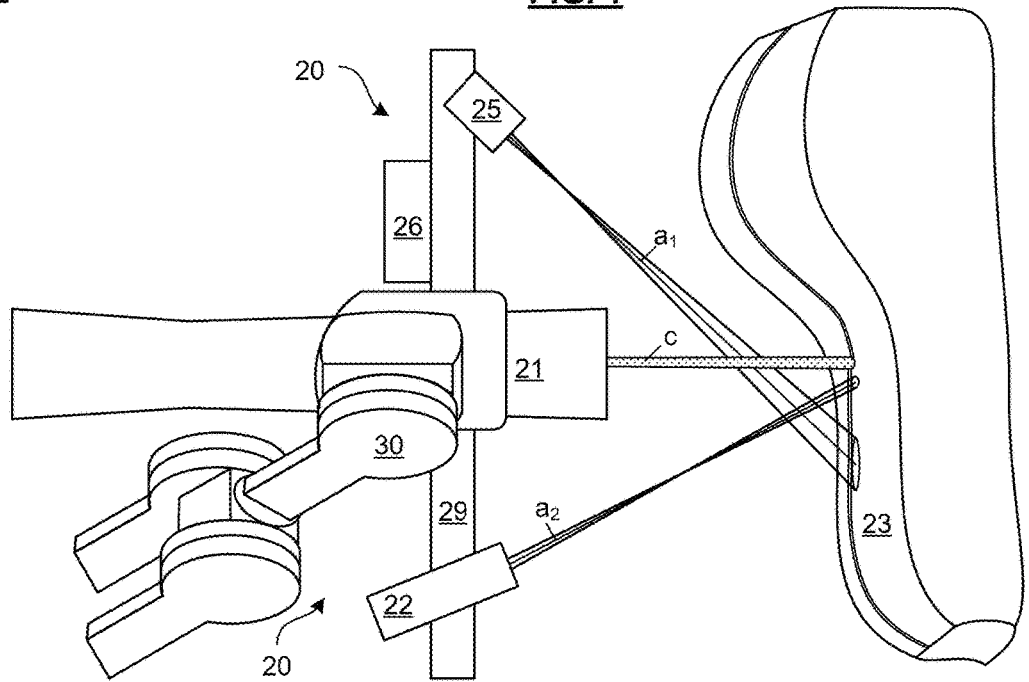
FIG. 2A is a schematic illustration of a robot-mounted cold spray deposition system in accordance with a first embodiment of the present invention.

FIG. 2A is top plan view schematically illustrating an embodiment of a CS deposition apparatus 20 in accordance with the present invention. Apparatus 20 includes the following elements: a CS nozzle 21; a laser most preferably a pulsed laser or equivalent source 22 (LED, focused high power lamp, etc.) with suitable power modulation to heat a deposition surface 23 of a part; and a RITS 25 with instantaneous measurement capabilities (e.g. an infrared camera or a pyrometer) for monitoring the surface 23, or a scanned part thereof. A controller 26 is provided for receiving data from the RITS 25, and for controlling the laser 22, and in some embodiments, also a robotic manipulator 30 that controls tool path. The manipulator 30 (only a wrist segment of which is shown) has at least 5 degrees of freedom for scanning the surface 23 with respect to the spray apparatus 20, such as a standard 6-DoF robot. The robot may have further articulations for independently controlling pitch/yaw of the laser 22 or (preferably and) RITS 25. The nozzle 21, laser 22, and RITS 25 are all mounted on a common frame 29, so that they co-scan the surface 23. The centreline c is an axis about which a CS jet of supersonic gas propels entrained particles towards the surface 23. The particles deform on contact to form a deposition bead. In the illustrated example, the bead is adjacent to a previously deposited bead (previous scan) that are all substantially adjacent to form a pass.

The laser 22 heats the surface 23 to achieve desired deposition conditions and the resulting material properties. The laser 22 needs to supply enough power to be able to obtain the required temperature within a short dwell time. The fluence to deliver will be determined by the part material, geometry and surface state. In order to compare the effect of different lasers with various powers, pulse length, spot sizes and beam traverse speeds, the concept of energy density can be conveniently used. The following equation defines the energy density=$P/A \times d/v$ (J/cm$^2$), where: d is the laser spot diameter; P is the laser power; A is $\pi(d/2)^2 \sec\theta$, where θ is an angle of incidence and the substrate is planar across the spot; and v is the traverse speed.

To achieve a surface temperature required for a desired deposition efficiency and density, while avoiding oxidation of deposited metal, it is helpful to reduce a duration and area over which the substrate surface is heated. By modulating the power of the laser, laser pulse width, or duty cycle, and possibly also the area A, Applicant has shown below that pulsed lasers have substantial advantages in terms of temporally localized heating. A pulsed laser can reach the required surface temperature only for a short amount of time during the deposition process. This modulation can be in the form of relatively long pulses with repetition rates and duration on the order of milliseconds. It is worth noting that pulses can be modulated as a function of time in order to optimize coating properties. Known laser pulse modulation schemes can be used with internal or external laser modulation.

The RITS 25 and pulsed laser source 22 respectively have axes $a_1$, $a_2$ that are generally facing the surface 23 as well as the centreline c. The laser 22 projects a laser fluence onto the surface 23 where it meets $a_2$, and the RITS 25 projects a laser fluence onto the surface 23 where it meets $a_1$. The illustrate arrangement has a laser fluence spot size on the surface 23 of a size that generally matches a dimension of the bead as deposited, and is shown very close to the cold spray jet deposition which may be advantageous for heating the substrate substantially immediately before CS jet impact.

The location of the laser 22 spot on the surface 23 with respect to the CS jet impact site is chosen to obtain desired deposition parameters. This laser spot may be adjacent to, or partially, or completely, overlap the CS jet. Overlap may imply some heating of the CS jet powders prior to and during impact, and angles between c and $a_2$, may be chosen to promoting a desired amount of powder heating just prior to impact, within the limited time available for interaction. A spacing can allow for the CS jet to arrive when the substrate is at a given temperature, and may also be chosen for the cooling or heating rate. As noted by Jensen, heating a small area of the surface can ensure very high accuracy deposition of the CS, as where the substrate is colder, deposition efficiency may be low. The laser spot size thus defines a small area of intense heating, but thermal conduction allows for a broadening of the temperature profile in the wake of the spot. Accordingly selecting a lag between the pulsed laser 22 spot and the CS jet can affect a spatial temperature gradient that can be beneficial for controlling deposition conditions and bead properties. While the illustrated example shows the laser spot size about the same diameter as the CS jet, as this would be efficient for maximizing deposition of a coating, the CS jet may equally be broader than the laser spot, in order to more accurately delimit the deposition.

The location of a sensed temperature on the surface 23 relative to the CS jet and laser spot is less sensitive. As long as the measurement is at a known position with respect to the substrate, a variety of locations can be used. The temperature can be sensed in a parallel path to the laser and CS jet, and may lead or follow the scan. In the illustrated embodiment, the temperature is measured substantially in front of the CS jet and the laser spot. This follows the logic that the temperature is measured at point $s_1$, a time lag before the laser is applied or modified to accomplish the desired heating, which then provides the desired heat and distribution for receiving the CS jet. The thermodynamic model of the part works substantially as well if the bead is examined just after the deposition, to determine the effect of both the heating from the CS jet, and the pulsed laser 22.

It may be preferable that a line of sight centred on axis $a_1$ avoid crossing the CS jet, and the pulsed laser beam, and moreso that it does not pass in and out of either of these during scanning, to avoid confounding the surface measurement with particles of the CS jet and gas that have different temperatures, or back-sprayed particles from the surface 23. An advantage of measuring the temperature at the bead is the opportunity to record cooling rates of the deposited material, and possibly to inspect the bead.

Independent (from the robot 30) control over pitch and yaw of each of the laser 22 and RITS 25 can provide for a controlled arrangement of the spot and measurement location with respect to the centreline c depending on the tool path, any substrate shape, and any added material thereon. Advantageously a relatively small angular displacement may be satisfactory for a wide range of applications, as a range of stand-off distances of cold spray nozzles is fairly well circumscribed, and accordingly very small displacements relative to frame 29 can move the spot or measurement location a desired distance with respect to the surface 23. The control may be provided by redirecting light between the RITS 25 or laser 22 and the surface 23, as opposed to moving the devices. Both the RITS 25 and laser 22 may be co-controlled in pitch or yaw, or both, with suitable limitations of the tool path relative to part and bead curvatures.

Control over only one degree of freedom, that follows a direction of traverse movement, may be preferred in certain applications. If the measurement location of the RITS 25 is broad enough, and the surface contours are flat enough, or if it produces an image of the surface 23 with a large enough field of view, the RITS 25 need not be controlled over pitch or yaw.

The laser 22 and RITS 25 may also be fixed with respect to the frame 29. If so, each measurement interval will be associated with a measurement location on the surface 23 that varies in distance to the spot s (in proportion to the curvature of the surface 23, and the pose of the frame 29), but with accurate modeling of the substrate and the additive process, compensation can be provided for the process.

The controller 26 is shown mounted to frame 29, however in principle it can be separate from the frame 29, with wired or wireless communications with the RITS 25 and the laser 22, or may be collocated with a controller of the laser 22 or its modulator (whether internal or external). The controller 26 may also be the robot 31's controller or a process controller adapted to direct the robot 31, or from a separate processor from all of these. Within a feedback interval, the measured temperature at the measured location (or an analog or digital indication thereof) is transmitted to the controller 26, which compares this with an expected value at the measurement position, and determines what actions to take, at least by the laser 22. The expected value may be a simplified and contextualized value determined from a thermodynamic model for the tool path and the position of the frame 29 on the tool path. The value may also depend on: an error or uncertainty of the centreline c, the spot, and measurement location with respect to a planned tool path (e.g. a measured excursion); an environmentally observed condition of the process (temperature and pressure of ambience); any variation from steady state of the CS jet; and operating parameters of any secondary, lower responsivity, thermal systems including heating or cooling systems and contact measurement observations of a holder of a part, if available. The controller 26 may perform sub-routines for determining from feedback, optimal positions of the measurement location or spot, and control pitch and yaw (or one DoF actuators), and the controller 26 may further control execution of a planned tool path, by allowing for a variation in speed, or one or more other parameters of the tool path, for correcting error of the tool path, or, in some applications, for changing a tool path in response to a set of operating conditions. As will be appreciated by those of ordinary skill, the controller 26 may be instantiated on one or more hardware processors and devices and perform the functions required.

An algorithm is required for producing feedback for controlling a laser. The algorithm is based on feedback from a RITS, and may advantageously also factor in previously depositions, and time of deposition; a log of RITS measures of the part; a planned tool path; a part model, such as an iterative computer aided design of the part build up; a heat response model that may include a delay in control response, as well as variations in part surface heating based on angle of incidence, emissivity, focus, spot size, and surface morphology; and CS modeling software that define nozzle parameters that affect heating of the part. The feedback to the laser is preferably computed off-line with all these models to, at each point in the tool path, predict, a temperature for the desired deposition properties at a subsequent point in the tool path given the RITS feedback. The prediction may be precomputed, with the use of lookup tables and bounded-latency runtime operations. Alternatively an AI can be invoked to receive the feedback, and issue commands to one or more of the laser, laser modulator, and optics controller. In general these changes may vary the laser fluence, pulse rate, duty cycle, intensity, polarization angle, or focus, and may also vary the position of the spot relative to the CS jet.

The algorithm may be executed to build up a part with a planned set of tool paths, to: test the subsystems of the deposition system; optimize tool paths; test and verify mechanical properties of the parts produced according to different processes; to output a robot tool path and laser control process file for mass production of an additively manufactured part; to identify a minimal effective number of measurement points required to determine feedback for a rote procedure for mass production of a part; or to provide a 'traveler document' attesting to deposition conditions of the part as built.

FIG. 2B schematically illustrates a second embodiment of a CS deposition apparatus 20 in accordance with the present invention. Herein features bearing a same reference numeral in distinct drawings refer to the same features, and descriptions thereof are not repeated except to note any difference in the context of the different drawing. The principal differences between FIGS. 2B and 2A are that the substrate is a smaller part relative to the CS deposition apparatus 20, and movement is of the part relative to the CS jet. To this end a table 28 is provided for moving the surface 23 in XYZ, moment about Y and moment about X. Rails for Y and Z direction movements of the table 28 are in view.

FIG. 2B also shows two lasers 22. It will be appreciated that multiple heating spots of different size and energy density can be used. For example as shown, a small spot may be used to rapidly heat the substrate just before the CS jet impinges on the surface, and a second, more diffuse, spot may slow the cooling rate of the deposited bead, in order to improve a microstructure of the bead, or to improve adhesion of the coating.

The CS deposition apparatus enables the method of FIG. 1, and forecasts, monitors and controls in real-time CS deposition, adjusting surface temperature to improve deposition conditions and regularity thereof. The CS deposition apparatus combines hardware and software allowing for: surface pre-treatment such as ablation and cleaning, surface pre-heating, heat assisted deposition, and post-deposition annealing.

Substrate ablation and cleaning: metallic substrates and parts surfaces are often oxidized and/or contaminated. In order to ensure optimal coating properties such as adhesion, cleaning of the surface prior to deposition is often required. Using a laser in ablation mode can vaporize the unwanted contaminants and remove the oxide layers. Providing short time between ablation and deposition can reduce oxide formation of metals that are particularly sensitive to oxidation, such as aluminum.

Part pre-heating & heat assisted deposition: an increase in the surface temperature can be beneficial to the deposit properties. This can be achieved prior to deposition via part pre-heating or via simultaneous use of the pulsed laser during the cold spray deposition. In both cases, precise control of the laser fluence's energy density is required to obtain the desired temperature.

Post-annealing: using the pulsed laser to heat treat the deposited material can improve the deposited material properties via for example, densification or grain size control.

Figure 3:
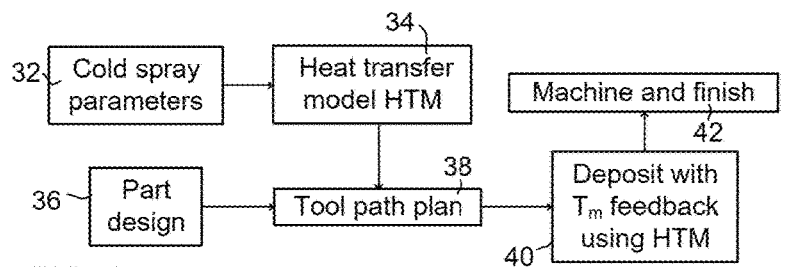
FIG. 3 is a block diagram showing principal design steps for controlled heat transfer in cold-spray.

FIG. 3 is a schematic flowchart illustrating a process for CS product development incorporating the advantages of the present invention. The general product workflow can be summarized in three major steps: 1) determining CS conditions; 2) modeling and tool path planning; and 3) execution with real-time feedback.

Selecting CS conditions: The identification of the cold-spray parameters may be made on coupon-sized samples so that the deposited beads obtain specified deposition properties. Laser parameters are defined such as power, dwell time, spot size, needed to achieve the required temperature, or temperature profile in space or time; need for cleaning; pre-heating; post-heating; etc. Preferably, verification of the temperature or profile by means of an infra-red (IR) camera, or pyrometer, thermal imaging measurement of the surface temperature profile for those respective sets of spray parameters is carried out to improve association of the desired properties with the measured temperature or profile. The temperature values recorded and analysed are fed to a heat-transfer simulation software module for forecasting heat transfer (baseline) for large and complex surfaces.

Modeling and tool path planning: Part geometry is taken into account to plan and design the tool paths to obtain the required deposition thicknesses and properties while taking into consideration the thermal requirements to obtain parts with acceptable properties. Applicant is currently developing a simulation module that forecasts the temperature profile with the cold-spray controlling software (e.g. similar to Computer Aided Machining (CAM) software). The simulation module is based on the CS jet's tool path, the dimensions of the part (detailed into a CAD drawing) where deposition takes place and physical properties of materials involved i.e. base+applied material.

Monitoring and real time feedback: During the spray process, monitored temperature data is acquired and is fed to the control software, which provides real-time feedback to at least a pulsed laser, and possibly also to a cooling system (e.g. cool jet of air) to improve the CS conditions, especially with respect to the surface temperature as a function of the position of the cold spray nozzle over the part. The monitoring is performed by an infrared camera and/or a pyrometer, and records of surface temperature can be maintained to provide real-time feedback to the cold-spray controlling software. The records may be delivered with parts for a complete record of the part, such as in a traveler document. The records, in combination with any longevity feedback or sampled testing, may further provide data for the heat-transfer simulation software module or AI for quality assurance, or for machine learning of improved CS deposition parameters. In any case, in-situ adjustment of the heating or cooling conditions is made without coating process interruption, as long as the feedback delay is shorter than the scan duration. After final machining a finished part is produced. Initial process planning combined with real time monitoring and feedback may improve speed, reliability and precision of CS products, especially for additive manufacturing, or coating complex parts.

FIGS. 4A-F are schematic illustrations of beam delivery systems for delivering the pulsed laser 22 fluence to a spot on the surface. While each of these drawings show the CS jet, it will be appreciated that the pulsed laser can be used without the CS jet as laser ablation for cleaning or preheating prior to deposition, or after the deposition spot (post-treatment). The tool paths for CS deposition may precede, follow, or be interspersed with identical tool paths for these other functions, and multiple pulsed lasers may be used.

In a simple example, typical of the CS deposition, the robot covers or coats a region of a surface with a lateral movement from left to right stepping in the transverse direction at each change of direction. Suitable tool paths can maintain a constant stand-off and deposition angle, but with a variable traverse speed, requiring the CS nozzle 21 to follow at a constant distance from the bead. However, this leverages no advantages of the ranges of deposition parameters with temperature control can achieve desired deposition properties, with fewer, and shorter tool paths. Leveraging these simplified tool paths generally requires that the laser 22 have independently controlled one or more degree of freedom (DoF) joints, e.g. to tilt/rotate the laser 22. However this solution may not be preferred if: 1) an inertia of the laser 22 makes moving the laser 22 slower than a required movement of the spot relative to the CS jet; 2) the pulsed laser 22 is fragile or it's operation is sensitive to abrupt movements of the tool path; or 3) the CS jet occludes a desired spot for some tool paths. An optical system may be provided to perform the task of orienting the laser spot. Mirrors mounted on galvanometers represent the preferred solution as the resulting movement speed would be fast, programmable and reliable. It should be noted that instead of mounting the laser 22 to the frame 29 (particularly in the embodiments like FIG. 2A where the frame 29 is mounted for movement), it could equally be housed at a safe distance from the frame 29, and the laser fluence from the laser can be delivered to the frame 29 by a waveguide, such as an optical fibre, an end of which can be easily manipulated.

Six optical configurations of such systems are provided for illustration. Note that distinct features of these optical systems are assumed to be combinable to form additional embodiments of the beam delivery systems within the present invention. Most solutions presented here are shown with one or two mirrors but more mirrors could be used for increased coverage or to overcome spatial constraints such as occlusions or to facilitate higher spot movement rates, as may be required for particular tool paths.

Figure 4A:
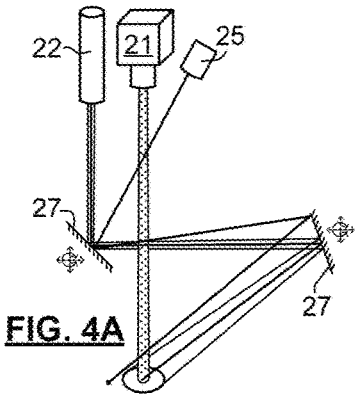
FIG. 4A is a schematic illustration of a variant of the invention with a pair of mirrors mounted on actuable joints for scanning the laser and temperature beams.

These different configurations have distinctive characteristics, advantages (+) and disadvantages (−) which are described in the followings and summarized in Table 1:

|  | FIG. 4A | Config 2 | Config 3 | Config 4 | Config 5 | Config 6 |
|---|---|---|---|---|---|---|
| Programming | + | + | ++ | − | − | ++ |
| Compact | + |  |  |  |  |  |
| Payload | − |  |  |  |  | −− |
| Part shadowing |  |  |  | − | + |  |
| Beam shadowing | −− |  |  | − | − | − |
| Optics in clean areas | −− | − | − |  | + | −− |

FIG. 4A illustrates a beam delivery system for a pulsed laser 22, and RITS 25, surrounding a CS nozzle 21, where these are suitably arranged for colocation on a common frame. The beam delivery system includes two actuable mirrors 27 mounted for X, Z motion and revolution about Y. Either or both of the actuable mirrors 27 can be mounted to the frame; can be otherwise stationary with respect to the frame, or could be adapted for co-movement with the frame. The two actuable mirrors 27 may only need to redirect the beams on the surface by one to a dozen cm from the CS jet. For a surface with limited curvature, this may require beam deflections of only minutes of arc, or mm of translation at mirrors 27, which is conducive to responsive control over laser spot position and angle.

FIG. 4A shows that the redirection of the illumination of the RITS 25 is equally controlled by the beam delivery system. This can be effective if the curvature of the surface is bounded and so a variation of the measurement location from the spot is small enough to be neglected, or can be computed based on the tool path planning.

The spot is shown centred on the CS jet, with the spot being more than twice the diameter of the CS jet. Advantages of this beam delivery system are the simplicity of programming, and the relatively compact arrangement, however limitations include a relatively high payload, prone to part and equipment shadowing, and that mirrors 27 may be prone to soiling by the CS jet and back sprayed particles, or ablated surface contaminants. Airflow control systems can be used to mitigate the last of these.

Figure 4B:
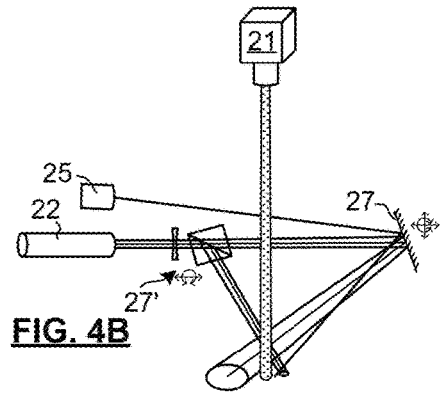
FIG. 4B is a schematic illustration of a variant of the invention with a mirror mounted on an actuable joint for scanning beams of the laser and temperature sensor, and a beam splitter for dividing a laser beam into two different beams for both preheating and post heating the substrate to be coated.

FIG. 4B illustrates an alternative beam delivery system for a laser 22, and RITS 25, surrounding a CS nozzle 21, where these are suitably arranged for colocation on a common frame, or on a separate frame. Some of the beam delivery system (mirror 27) is used for redirection of illumination for the RITS 25, and other parts (optics 27') is not. The laser 22 and RITS 25 are arranged generally normal to the CS jet, and therefore the laser can be kept in a clean area away from the surface (note the distance of the laser from the surface is schematic and may be meters away). The beam delivery system includes optics 27' which includes a beamsplitter and lensing system to disperse the laser fluence. The beamsplitter divides the fluence into two different beams, and the lens controls a focus of the beam such that a relatively tightly focused preheat beam precedes the CS jet, and a less focused annealing beam, follows the CS jet, for use in heat treating the as deposited bead. Rotation of the beamsplitter about the Y axis allows for a selection of a relative intensity of the beams, and translation in the X direction allows for a motion of the preheat beam relative to the annealing beam.

The mirror 27, and optionally also the optics 27', may be mounted to a frame holding the CS nozzle 21, which can also reduce potential for soiling the optics or mirror. This arrangement sees a least weight supported by the frame, and advantageously provides least mobility constraints on the robotic head. The spot, and beams are shown arranged with respect to the CS jet for adaptive control over preheating based on measured temperature before contact with the CS jet.

Figure 4C:
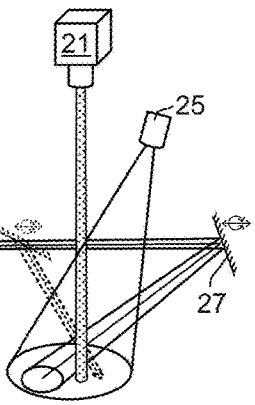
FIG. 4C is a schematic illustration of a variant of the invention with a mirror mounted on an actuable joint for scanning the laser and temperature sensor, with a high scan length in one direction.

FIG. 4C shows another embodiment in which the general position of the pulsed laser 22 is perpendicular to the CS jet. The beam delivery system consists of one moveable tilt-rotate mirror 27, with a long X axis range, that permits the laser to function in either a preheat or post heat mode, with or without crossing the CS jet. An advantage is relative simplicity, and co-arrangement of the CS nozzle 21 with the RITS 25, and possibly the mirror 27 on its track. Programming for a reasonably wide range of tool paths is possible with a relatively low payload, the laser remains in a clean area, and little optics are needed. However, the offset of the perpendicular beam from the CS jet may result in some difficulties with some deposition surfaces having low radius Y direction curvature, and soiling the track of the mirror 27 should be avoided. The limited DoFs makes it harder to compensate for occlusions. The spot size of the pyrometer RITS 25 is shown to be large, and to encompass the CS jet and spot (for annealing or preheating).

Figure 4D:
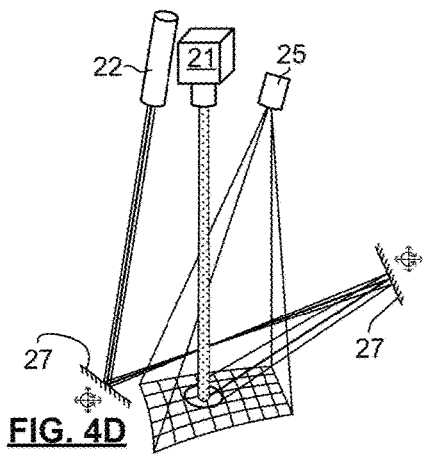
FIG. 4D is a schematic illustration of a variant of the invention with two mirrors mounted on actuable joints for scanning the laser, with one mirror mounted on a substrate holder and the temperature sensor is a pixel-based device.

FIG. 4D schematically illustrates an embodiment with the pulsed laser 22, RITS 25 and CS nozzle 21 arranged for mounting to a common frame, and for two actuable mirrors 27 mounted to, or fixed relative to, a support for a part bearing the deposition surface, or adapted for coordinated movement. Depending on a range of movements of the mirrors 27, the spot may be directed across a wide range of positions on the surface, and can avoid occlusions effectively, however an angle of incidence of the beam may be high, and programming may be more complex. The RITS 25 is a pixelated thermal imaging system such as an IR camera, able to measure temperatures at various positions on the deposition surface at once.

Figure 4E:
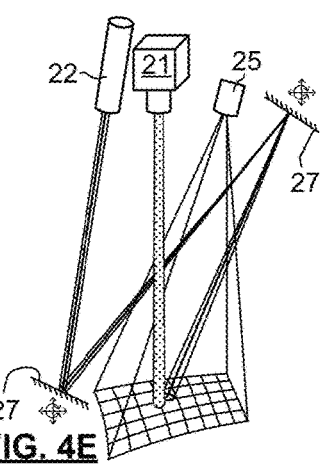
FIG. 4E is a schematic illustration of a variant of the invention with two mirrors mounted on actuable joints for scanning the laser, with one mirror mounted on a substrate holder and the other on a spray apparatus, with a pixel-based temperature sensor.

FIG. 4E schematically illustrates a beam delivery system with two 3 DoF mirrors 27, one mounted with the pulsed laser 22, RITS 25 and CS nozzle 21, and one mounted on a holder for the part bearing the deposition surface. Advantageously all optics can be housed in a clean area, and equipment occlusion is avoided, however programming of the beam delivery system can be complex, and CS jet occlusion becomes more difficult.

Figure 4F:
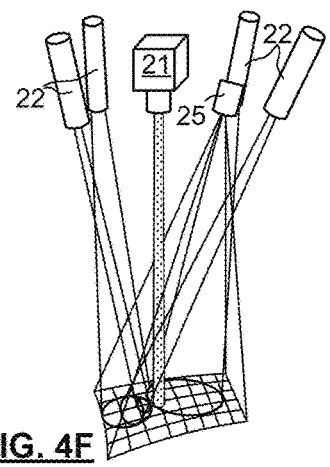
FIG. 4F is a schematic illustration of a variant of the invention with four lasers for heating respective regions of different sizes, where the temperature sensor is a pixel-based device.

FIG. 4F schematically illustrates a beam delivery system with four pulsed lasers 22, each configured to heat a respective region of the deposition surface. Each laser 22, the IR camera 25, and CS nozzle 21 are arranged for mounting to a common frame. Three of the lasers 22 are nested preheat lasers, with diminishing spots that occupy less than half the area of the previous laser, such that all three lasers are coincident the surface immediately before the CS jet. A fourth of the lasers 22 is an annealing laser for heat treatment of the as deposited bead. This beam delivery system has no moving parts, and allows for very simple programming. Preferably only optical fibre heads are mounted to the frame to reduce a weight of this system.

FIG. 5A is a modelled temperature generated using a commercial finite element CAD software (at a point on a surface as a function of time, when subjected to relatively short pulsed laser heating (10 ms or 100 ms) pulse rates). Mean temperatures and peak temperatures are plotted. The graph shows that it is possible to obtain very fast local heat-up rates for a very short period of time, which is advantageous because the high temperature can be provided without increasing the temperature of the whole part (and also reducing power consumption).

FIG. 5B plots comparison of modelled short and long pulse laser heating effects. Having regard to FIG. 5B it will be noted that long period pulses with 50% duty cycle produces a substantial difference between the maximum peak temperature, and the average. This difference can be useful for increasing a deposition efficiency or density of a CS bead, or to improve microstructure of the bead, and can also allow for a wider variety of deposition angles, or tool paths to deposit CS material. Attaining a high peak temperature in a small area for a short interval, while using a lower average input energy, imparts a lower average heat input to the substrate and can avoid oxidation or damage from overheating of the part. While overheating is not strictly avoided, heat damage may be avoided by the very short duration and small area of the overheating.

Accurate surface temperature measurement via thermal imaging (IR camera) requires that the precise value of the emissivity of the surface investigated be known. Emissivity is the physical parameter quantifying the efficiency of a surface for radiating energy in a defined waveband and at a given temperature. Emissivity values are very specific to the material type, surface condition and, especially for metals, the temperature of the material. When emissivity values are input into the recorded thermal image (or film of a process) the raw data can be corrected. However, for a process like cold-spray (even more for laser-assisted cold-spray) it is challenging to determine an accurate emissivity value near the CS nozzle's stagnation point (i.e. where hot gas/particles impinge the substrate) and where the part meets the laser's beam. In addition, when a correction is made, the resulting changes are made to the entire image. As emissivity varies across the deposition surface, separate corrections must be made for each measurement point.

To alleviate these shortcomings related to the IR thermal imaging, a ratio pyrometer (either a Dual-Wavelength or a Two-Colour) can be used such that the stagnation point is always in the field of view of the pyrometer. This method of surface temperature measurement allows ratio sensors to automatically compensate for emissivity variation (for 'greybody' materials), partially occluded fields of view, and dirty optics. Both Two-Colour and Dual-Wavelength pyrometers can compensate for emissivity variation, slight surface oxidation, and moderate misalignment. Certain Dual-Wavelength pyrometers can view through common industrial interferences like steam, flames, water, and plasmas. Maximum surface temperature during the laser assisted cold-spray process can thus be determined accurately without a need for emissivity estimation.

EXAMPLE 1

Copper CS Deposition on Circular Plates

FIG. 6A is a photograph of a delaminated copper coating that was CS deposited onto a mild steel substrate deposited without laser assistance. FIG. 6B is a photograph of a copper coating deposited on the same substrate with continuous laser assistance. Both coatings were produced using Inovati™ (Santa Barabara, CA.) low pressure CS gun using nitrogen at 300° C. and 90 PSI with the gun traverse speed of 10 mm/s. The surface of the samples were grit blasted using alumina grit 60 particle in preparation for the deposition. In depositing the coating shown FIG. 6B the first pass used a laser beam spot size (at surface) of 6 mm and power of 750 W. Subsequent passes did not have any laser assisted heating. The adhesion improved as the coating remains on the coupons after deposition. Visual inspection showed that the coating is oxidized (darker color).

EXAMPLE 2

Power Density Vs Bond Strength

A study of the effect of power density of continuous lasers on bond strength of coatings was performed. Coatings were produced by cold spray of commercially pure copper powder using Plasma Giken™ PVS-800 gun at 800° C. and 4.9 MPa pressure Nitrogen. A stand-off distance of 30 mm was used for the cold spray gun. The laser power varied and two lasers were used one 4 kW and one 1.6 kW. Laser spot sizes were 6.5 and 15 mm. The laser and the cold spray gun were mounted on the same robot and the displacement velocity (10 mm/s and 300 mm/s) were varied. Overall, increased energy density leads to improved adhesion, as seen in FIG. 7. The effect of surface temperature is noticeable. Even with 4 kW power at 300 mm/s, there is no adhesion of copper to the mild steel, but at lower speed (10 mm/s), even with lower (1.6 kW) power, the bond strength exceeds the test capabilities, and it is a glue that fails before the coating delaminates.

EXAMPLE 3

Pulsed Laser Vs. No Assisted Heating Surface Adhesion of AM Rings

FIGS. 8A,B are photographs of CS additively manufactured part (ring) adhesion on a mild steel substrate by cold spray. In these tests, AM rings were placed on mild steel substrates and cold sprayed along their interface in an effort to join the rings to the substrates. To improve adhesion, the mild steel substrate shown in FIG. 8A was grit blasted using grit 24 alumina, but the substrate was not grit blasted in the example of FIG. 8B. In both cases, cold spray was deposited with a zigzag pattern with 1 mm step size. The traverse speed was 50 mm/s. The cold spray jet from the Inovati gun was about 480° C., and 120 psi. The stand-off was 15 mm giving a laser spot size of about 6 mm. Both the particle jet and the laser jet were supperposed. The embodiment of FIG. 8B was different only in that the substrate was not grit blasted (used as-received), and for the $1^{st}$ pass only a 4 kW, 10 Hz, 10 ms (400 J/cm$^2$) pulsed laser was used.

The adhesion between the substrate the cold spray manufactured cylinder is increased by the use of a pulse laser assistance while depositing the first layer of copper, and otherwise the CS AM ring debonds, even with a uniform layer of copper between the substrate and the ring. Note that with laser heating the parts remains adhered on its substrate which enables the building of thicker components.

EXAMPLE 4

Adhesion Improvement with Pulsed Laser

Pulsed laser assisted heating was found to improve adhesion of dense coatings Three coatings were produced using the same cold spray conditions and materials, varying the laser conditions. The cold spray deposition of commercially pure copper powder was done with the Plasma Giken PVS-800 gun using a nitrogen carrier (800° C. and 4.9 MPa). A stand-off distance of 30 mm was used for the cold spray gun. Two pulsed laser assisted CS coatings were deposited at a 5 ms repetition rate, a duty cycle of 50%, and 2000W power. The energy density was varied by changing the laser spot size and transverse speed. The first was pulse laser heat-assisted CS deposited with an energy density about 950 J/cm$^2$ with a 40 Hz pulse frequency, and found to provide high adhesion in that failure during testing was of glue and not along the coating substrate interface. It therefore had a bond strength greater than 47+/−4 MPa. The second was pulse laser heat-assisted CS deposited with an energy density about 1900 J/cm$^2$ but at 80 Hz frequency, and also found to fail by fracture of glue and not along the coating substrate interface. A third sample was coated with assisted heating from a 750W continuous laser. It failed at 35+/−5 MPa. A CS coated substrate with no assisted heating failed at less than 5 MPa. It has therefore been demonstrated that pulsed laser heating can increase bond strength over continuous wave laser assisted heating. The first sample had a substantially lower energy density than the second or third, and the second was about 100 J/cm$^2$ higher than the third, but both the first and second have substantially higher bond strengths than the third. Oscillating heat supply appears to offer a better way to control accumulation of heat within the sample.

EXAMPLE 5

Varied Energy Density on Each Pass

Using high laser power can induce stresses in the deposited material. To alleviate this effect, one possible avenue is to use a higher power level for the first few passes when the material is typically cold, and where the extra heat is needed for adhesion. Using coatings produced with the Plasma Giken cold spray apparatus, with the same parameters as above, bond strength of coatings of two kinds were compared: the first was deposited with a constant 4W laser assisted heating; and the second had five different passes, each pass having a decreasing energy density with the first applying 4 W, the second 3.2 W, the third 2.4 W, the fourth 1.6 W, and the fifth 0.8 W. The expectation was that graded temperature at deposition would result in graded residual stresses. Five samples were produced of the first kind, and four of the five had glue failure (strong adhesion). The bond strength of the first kind was found to be 82+/−7 MPa. The bond strength of the second kind, which had four samples, was 79+/−8 MPa (all four failed at glue). There is substantial overlap between these bond strength measures, indicating that whatever induced stresses were produced, at least in the second through fifth pass, they did not weaken the join.

EXAMPLE 6

Microhardness

Two 3 mm thick copper coatings were heat-treated using similar laser power density but with different power and traverse speed: sample A (500 W, 42 mm/s, 758 J/cm$^2$) and sample B (3 kW, 250 mm/s, 764 J/cm$^2$). The laser was set perpendicular to the surface and the sample moved in front of it. The microhardness profiles are compared in FIG. 9. Generally higher microhardness at greater depth implies that the heat treatment was effective at that depth. FIG. 9 shows that a higher thickness can be treated using a pulsed laser if we use a lower power and a slower movement speed.

Subsequently thick CS copper deposits were heat treated using a constant energy density. The laser power was varied between 500 and 1200 W; the traverse speed varied from 20 to 42 mm/s; and the number passes was varied from 1 to 15. Results indicate that mechanical properties can be modified using an appropriate set of laser parameters for post-treatment. FIG. 10 is a bar chart showing hardness evolution for different spray conditions that are listed in the table below.

| Sample | Power (W) | Traverse speed (mm/s) | Spot size (mm) | Number of passes | Energy density per pass (J/cm$^2$) |
|---|---|---|---|---|---|
| 1 | 500 | 42 | 2 | 5 | 758 |
| 2 | 500 | 42 | 2 | 15 | 758 |
| 3 | 1200 | 20 | 10 | 1 | 764 |

FIG. 11 is a photograph of a test coupon. A cold sprayed mild steel substrate as cold sprayed with the Plasma Giken using the parameters as above, except as noted. The first pass was applied with laser assisted heating using a constant 1.6 kW laser with a 15 mm diameter spot size, a tranverse speed of 10 mm/s and a reduced powder feed rate of 0.16-0.2 g/s. The later ($2^{nd}$-$4^{th}$) passes had feed rates of about 1.3 g/s, and a transverse speed of 300 mm/s. The coupon was cut into buttons (6 shown) by electrodischarge machining. Five of the buttons were tested and show the very high variability of the adhesive strengths of the coating, and the regularity with which these vary depending on the position of the button in the coupon: near an edge of the substrate, where the cumulative effects of laser heating is not produced, the samples have far lower adhesion. This is despite the fact that the laser was scanned with equal power across the surface. FIG. 11 is evidence that uniform laser fluence does not get uniform deposition properties.

Figure 12A:
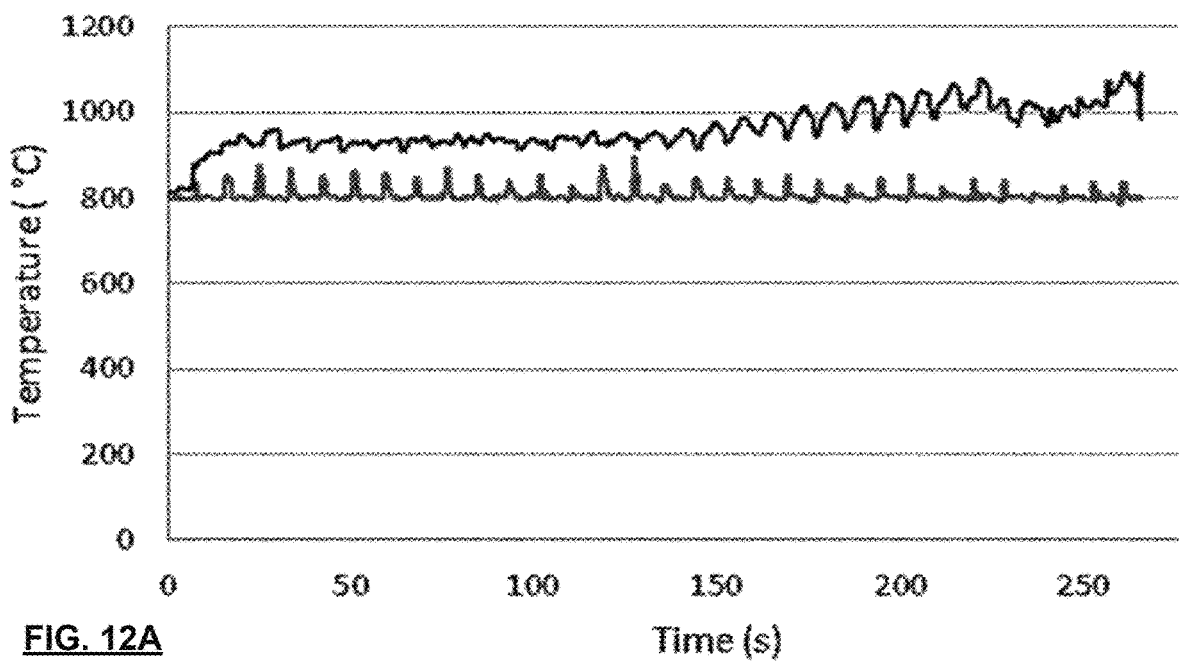
FIGS. 12A,B, respectively, are graphs showing surface temperature measurements with and without feedback from a temperature sensor, and laser power with and without feedback.

To show the capability to control temperature using feedback from optical pyrometers, the following experiment was performed. A cold spray nozzle (Plasma Giken) was used to deposit SS216L stainless steel powder with a feed rate of 0.13 g/s, Plasma Giken with nitrogen gas pressure 4.9 MPa, 700° C., operated with a transverse speed of 20 mm/s with a step size of 2 mm, and a stand-off of 40 mm. The cold spray was laser heat assisted. A RITS was used (optical pyrometer model IGAR 6™ from Lumasense Technologies in two-wave ratio mode using a k factor of 1.1) to acquire temperature data in each 120 ms time step (about 8 Hz). The temperature data was used with the objective of keeping the temperature at 800° C. The laser was directly modulated (electronically). FIG. 12A shows two graphs showing measured surface temperature as a function of time. The surface temperatures of the generally top graph were obtained with no temperature control, and they varied substantially from 800-1100° C. The surface temperatures of the bottom graph were temperature controlled. Both curves show some steps associated with each scan, but the temperature control was successful in keeping the sensed temperature between 800° C. and 900° C., and between 800° C. and 820° C. at least 85% of the time, throughout the deposition.

Figure 12B:
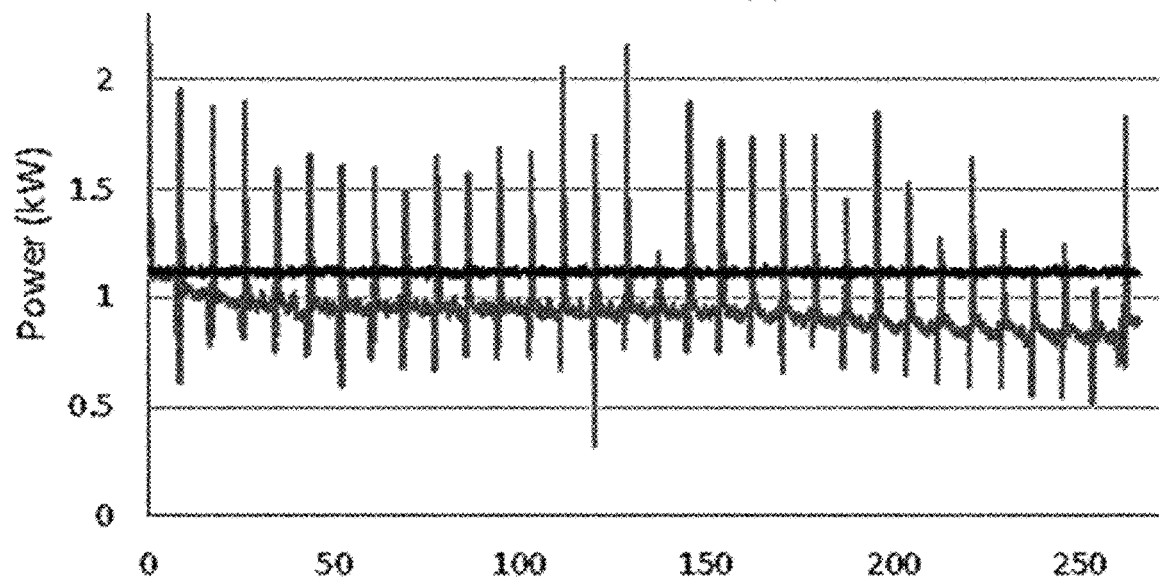

FIG. 12B shows the laser power as a function of time for the same process. Here the non-temperature controlled part has a flat power demand of 1.1 kW, and the temperature controlled process shows a variability of 0.3-2.2 kW.

It will be noted that both FIGS. 12A,B exhibit peaks. These map to respective scan lines, where the part has cooled and is rapidly brought back up to temperature, which is related to a problem of "overshoot" for which the example control algorithm is not optimized. Intermediate these striking peaks, there is clear evidence of modulation of the power, to maintain the temperature. Generally, each scan line/interval gradually decreases the power supply as cumulative heat from previous depositions affect the subsequent heating demand at these neighbouring points on the surface.

Figure 13A:
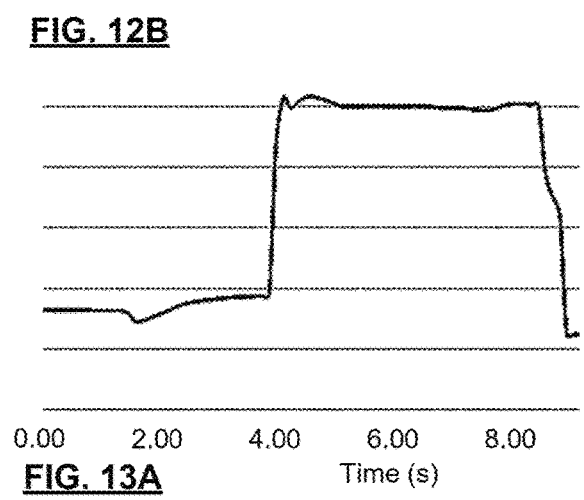
FIGS. 13A,B, respectively, are graphs showing surface temperature measurements with and without feedback from a temperature sensor, and laser power with and without feedback over a single scan of the substrate, illustrating better optimized temperature control.
Figure 13B:
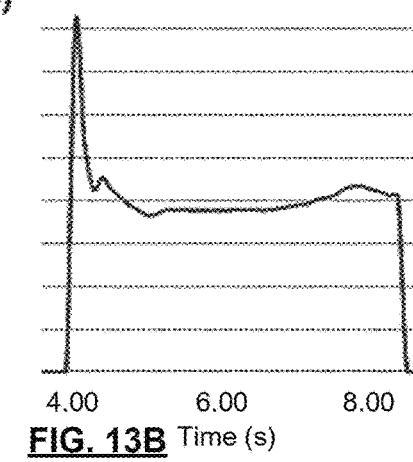

FIGS. 13A,B are examples of similar graphs, limited to a single scan line, and showing a vast improvement in the overshoot of the heating, in comparison with the example of FIG. 12. In comparison with the example of FIGS. 12, FIG. 13 was not done during cold spraying of a part, but rather shows that with a suitable adjustment of a PID controller, a far more uniform temperature can be provided across the surface within a scan line (i.e. starting at about 4 s). FIG. 13A specifically shows the measured surface temperature as a function of time of a single scan, and FIG. 13B shows the power demand.

While FIGS. 12,13 illustrate the principle of temperature control seeking a uniform temperature for deposition of scan lines, it is a principle advantage of the laser and temperature feedback control of the present invention that a wider variety of tool paths can be used, with laser control suitable to modifying temperature in response to changes in surface temperature, and to control deposition properties during deposition. Any temperature range can be desired or acceptable for any deposition point on a tool path, and the range may depend on all deposition parameters and nozzle parameters, as well as desired deposition properties.

REFERENCES

[1] N. Ryabinin, E. Irissou, A. McDonald and J. G. Legoux, Simulation of Gas-Substrate Heat Exchange During Cold-Gas Dynamic Spraying, International Journal of Thermal Sciences, 2012, vol 56, pp. 12-18;

[2] McDonald, A. G., A. N. Ryabinin, E. lrissou and J. G. Legoux (2013). "Gas-substrate heat exchange during cold-gas dynamic spraying." Journal of Thermal Spray Technology 22(2-3): 391-397;

[3] Perton, M., S. Costil, W. Wong, D. Poirier, E. Irissou, J. G. Legoux, A. Blouin and S. Yue (2012). "Effect of pulsed laser ablation and continuous laser heating on the adhesion and cohesion of cold sprayed Ti-6Al-4V coatings." Journal of Thermal Spray Technology 21(6): 1322-1333;0

[4] S. Rech, A. Trentin, S. Vezzù, J. G. Legoux, E. Irissou, M. Guagliano, Influence of pre-heated Al 6061 substrate temperature on the residual stresses of multipass Al coatings deposited by cold spray. Journal of Thermal Spray Technology, 2011, 20, pp. 243-251; and

[5] J. Legoux, E. Irissou, and C. Moreau, Effect of Substrate Temperature on the Formation Mechanism of Cold-Sprayed Aluminum, Zinc and Tin Coatings, *Journal of Thermal Spray Technology,* 2007, 16 (5), p. 619-626.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A temperature controlled, heat assisted, cold spray apparatus comprising:
a cold spray nozzle, a laser, a remote instantaneous temperature sensor (RITS), and
a robot for directing:
the nozzle to project a spray jet onto a surface of a substrate for cold spray deposition;
the laser to selectively heat the surface near or overlapping the jet; and
the RITS to sense a temperature of the surface at at least one first point near the jet;
while scanning the jet across the substrate according to a tool path, with controlled motion of at least one of the substrate, a holder for the substrate, and the cold spray nozzle, by the robot;
a controller configured to: receive a measured temperature from the RITS in a plurality of sequential time steps; and use the measured temperature with a model of the substrate and a planned traversal path, to control the laser to vary a laser output to ensure deposition at a time with respect to impact, will have desired deposition properties, and looking up a model-predicted temperature of the substrate at a first point with respect to impact conditions, based on a thermal model of the substrate; and
program instructions to configure the controller to:
get a current measured temperature at the first point from the RITS;
determine a temperature range required at a second point on the surface at a second time with respect to incidence with the jet to achieve a desired deposition property at a third point at incidence with the spray jet;
use the model-predicted temperature at the first point and the current temperature to determine a heat required at ond point; and
select laser output, given an angle of incidence of the laser beam on the point, and an emissivity of the surface the point, to raise the second point to a temperature in the temperature range at the second time.

2. The apparatus according to claim 1 wherein the nozzle, and at least an optical path element for controlling a beam of the laser, are mounted to a frame, and the robot comprises an actuator for scanning the substrate with respect to the frame.

3. The apparatus according to claim 2 wherein the nozzle and the at least an optical path element for controlling the beam of the laser have fixed orientations with respect to the frame.

4. The apparatus according to claim 2 wherein the nozzle has a fixed orientation with respect to the frame, and the at least an optical path element for controlling a beam of the laser beam is mounted to the frame by an actuable joint.

5. The apparatus according to claim 4 wherein the controller is configured to control the actuable joint.

6. The apparatus of claim 1 further comprising the program instructions to configure the controller to:
when determining the temperature range determine at least one deposition parameter of the planned path at the time of incidence at the third point, and use the at least one deposition parameter to select a temperature range to attain the deposition property.

7. The apparatus of claim 1 further comprising the program instructions to configure the controller to:
when selecting the laser output determine a beam profile of the beam centred on the second point required to distribute heat across the surface to achieve a deposition property; and control the laser by varying an optical reflection, diffraction or dispersion element to effect the desired beam profile.

8. The apparatus of claim 1 further comprising the program instructions to configure the controller to perform at least one of the following functions:
selecting the second time to be from +0.1 to −20 s to incidence with the jet; controlling the laser to heat treat post-deposition; selecting the desired deposition property to include at least one of: a density, ductility, and morphology of the deposition; and controlling the laser to meet the surface over a wider area than the jet.

9. The apparatus of claim 1 further comprising the program instructions to configure the controller to: select the second time to be greater than 0.1 s to incidence with the jet; control the laser to apply a pre-deposition treatment to clean, ablate, roughen, modify a surface metallurgy of, or heat treat the surface of the substrate; select the desired deposition property to include at least one of: a ductility, a morphology, a bond strength, and a cohesive strength of the deposition.

10. The apparatus of claim 9 wherein the laser has an energy density within an ablation regime for the surface, and is only applied to the surface before any cold spray material is deposited.

11. The apparatus of claim 1 further comprising the program instructions to configure the controller to:
select the second time to be between −0.1 s and 5 s to incidence with the jet; control the laser to heat the surface of the substrate to a desired deposition temperature; and select the desired deposition property to includes at least one of: a deposition efficiency, width of a deposited bead, bond strength, cohesive strength, and density of the deposition.

12. The apparatus of claim 1 further comprising the program instructions to configure the controller to:
select any two or all three of the first, second and third points to be the same or overlapping points of the surface at respective time points.

13. The apparatus of claim 1 further comprising program instructions to enable the controller to output a process control program including at least a collection of tool paths defining cold spray deposition of a structure on the substrate, and coordinated laser assisted heating parameters.

14. The apparatus of claim 1 further comprising program instructions to enable the controller to log temperatures measured by the RITS to document the deposition, said log useful for quality assurance and product verification and testing.

15. The apparatus of claim 1 wherein the laser is a pulsed laser having a pulse rate between 10 μs and 5 s.

* * * * *